Figure 2:
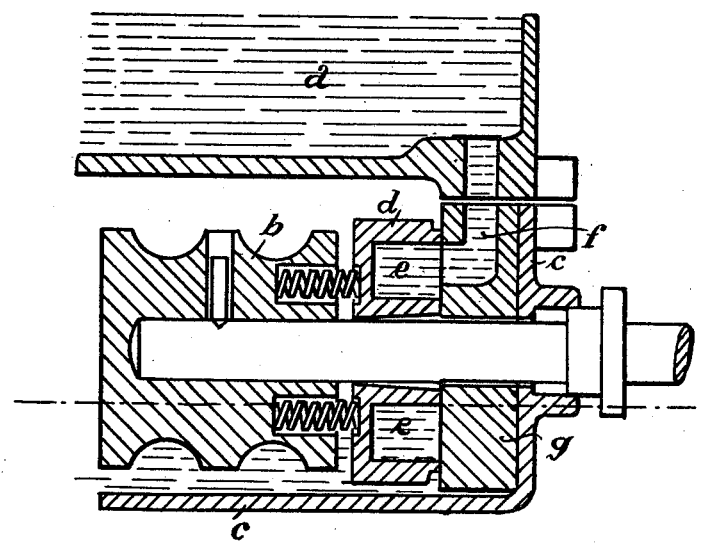

May 22, 1923.                                                                1,456,306
                                A. GRUTZNER
     CENTRAL LUBRICATOR PROVIDED WITH A DISTRIBUTING ROLLER ROTATING WITHIN
AN OIL RESERVOIR AND A DEVICE FOR OBTAINING A PERMANENTLY UNIFORM OIL LEVEL
                           WITHIN SUCH RESERVOIR
                          Filed Aug. 30 , 1921

Inventor
Arthur Grützner

Patented May 22, 1923.

1,456,306

UNITED STATES PATENT OFFICE.

ARTHUR GRÜTZNER, OF MEISSEN-ON-THE-ELBE, GERMANY.

CENTRAL LUBRICATOR PROVIDED WITH A DISTRIBUTING ROLLER ROTATING WITHIN AN OIL RESERVOIR AND A DEVICE FOR OBTAINING A PERMANENTLY-UNIFORM OIL LEVEL WITHIN SUCH RESERVOIR.

Application filed August 30, 1921. Serial No. 497,039.

*To all whom it may concern:*

Be it known that I, ARTHUR GRÜTZNER, engineer, a subject of the Republic of Saxony, German Republic, and resident of 20 Gartenstrasse, Meissen-on-the-Elbe, Republic of Saxony, German Republic, have invented a new and useful central lubricator provided with a distributing roller rotating within an oil reservoir and a device for obtaining a permanently-uniform oil level within such reservoir, of which the following is a specification.

The present invention has for its object to provide a central lubricator having a distributing roller rotating within an oil-reservoir and a device for obtaining a permanently uniform oil-lever within said reservoir.

The invention is characterized in that containers inserted between the oil-supply reservoir and an oil-box surrounding the roller are provided or arranged within a press-ring rotating together with the roller and subject to spring-action, in a known manner, in such a way that a stationary seat closing the said press-ring against the oil-supply reservoir is connected, on the one hand, with a supply-conduit and, on the other hand, with an aperture or opening, the upper edge of which limits the normal oil-level within the box surrounding the roller. By this arrangement the rotating intermediate containers allow the oil to be supplied only if the oil-level within the roller-box has descended below the normal level.

Relatively to the known roller-lubricating apparatus, the present invention enables a permanently uniform oil-level to be obtained within the roller lubricating apparatus for the purpose of supplying a permanently uniform quantity of oil, a result which could not be obtained heretofore.

In the central-lubricating apparatus arranged according to the present invention an immediate discharge of oil from the intermediate oil-container into the quantity of oil remaining within the roller-box takes place on the least decrease or reduction of the oil-level and from the intermediate container permanently held filled through the supply-reservoir, so as to fill said quantity of oil again up to its normal level. During this process the roller-box as well as the oil-supply are fully separated from or closed against the atmospheric air, a fact which, in comparison with the known lubricators, is of great advantage inasmuch as the variation of the oil temperature caused by the atmospheric air is fully obviated. However the maintenance of a uniform temperature is of greatest importance for a uniform discharge of oil.

Whereas the known lubricating ring, provided for loose pulleys and subject to spring-pressure, causes a constant supply of oil to the part of a shaft to be lubricated and the cavities provided for in the known oil-conduits directly supply a quantity of oil (which is intended to constantly remain uniform or equal) within definite intervals, to only one point to be lubricated, the combination of said known devices serves, according to the present invention, as a controller for the supply from a supply reservoir to a second reservoir in such a manner that the quantity of oil supplied is not dependent on the volume or contents of the oil chambers and the speed of their rotation, but solely on the variations of the height of the oil level within the roller-box, that is, on the demand for oil. Besides this, the central lubricator according to the present invention ensures the highest possible saving or economy of oil by the fact that, during the filling of oil into the lubricator, a loss of oil is not caused by spilling, as takes place for instance with dropping-oilers, but that only the quantity of oil really necessary is supplied to the points of an engine to be lubricated. Finally only pure oil is supplied to the points to be lubricated for the reason that the possibility of soiling the same from outside is obviated.

The improved lubricator according to the present invention is represented, by way of example, in the drawing annexed hereto in which—

Fig. 1 shows a longitudinal section of the central apparatus;

Fig. 2 a rearward view of the press-ring provided in said apparatus, and

Figure 3:
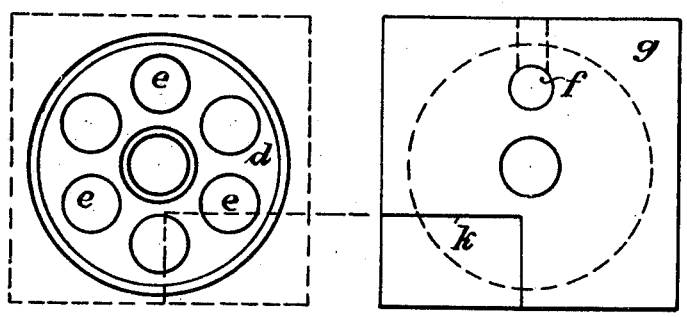

Fig. 3 an elevation of the seat for said press ring.

An oil-box $c$ surrounding the roller $b$ is arranged below the oil supply reservoir $a$ and a press-ring $d$ is inserted between said oil-box and the reservoir $a$, said press-ring being subject to springs in the usual manner and provided with a number of intermediate containers $e$ arranged in a circle. The front side of the press-ring $d$ opposite to the roller $b$ is in contact with a seat $g$ (Fig. 3) separating such press-ring from the supply-reservoir $a$.

A supply conduit $f$ connected with the supply reservoir is provided in the upper part of the seat mentioned, in the lower part of which an opening or aperture $k$ is provided. Said aperture $k$ which is clearly seen in Fig. 3 limits by its upper edge or rim the normal oil level within the oil or roller-box $c$ in such a manner that the intermediate containers $e$ provided in the press-ring $d$, and rotating together with the roller, can discharge only when the oil within the oil or roller box has descended below its normal level.

Having now particularly described and ascertained the nature of my said invention and in what manner the same is to be performed, I declare that what I claim is:

1. A lubricating apparatus comprising a lubricant level controlling member, a revoluble member having a plurality of pockets therein, and means for supplying lubricant to said pockets, the said lubricant level controlling member and the said revoluble member coacting to permit the discharge of the lubricant from the said pockets to a discharge chamber when the lubricant in the discharge chamber is below a predetermined level.

2. A lubricating apparatus comprising a reservoir for a lubricant, a lubricant box to which lubricant is to be supplied, a lubricant level controlling device, a revoluble member having a series of pockets therein, there being a channel for supplying lubricant from the said reservoir successively to the said pockets, and means for turning the said revoluble member whereby in its coaction with the said lubricant level device the lubricant is permitted to discharge from the said pockets to the said lubricant box when the lubricant therein falls below a predetermined level.

3. A lubricating apparatus comprising an oil reservoir, an oil box, a lubricant level controlling member, a revoluble device adapted to bear against a surface of the lubricant level controlling member and having a plurality of circularly arranged pockets therein, there being a passage from the said oil reservoir through the said lubricant level controlling member for supplying oil from the reservoir to the said pockets as the same register successively with the orifice of the said passage, means for maintaining the revoluble member in contact with the face of the oil level controlling member, and means for turning the revoluble member whereby the oil is permitted to discharge from the said pockets in the revoluble member when the supply in the oil box falls below a predetermined level.

4. A lubricant apparatus comprising an oil reservoir, an oil box, an oil level controlling member, a ring having a plurality of pockets therein, there being a passage from the oil reservoir through the said oil level controlling member, and there also being a recess in the said oil level controlling member, a shaft upon which the said ring is loosely mounted, and means for turning the said ring from the said shaft and yieldingly maintaining the ring in contact with the surface of the said oil level controlling member whereby as the said ring turns oil is permitted to flow from the reservoir successively into the said pockets and to flow from the said pockets into the said oil box when the oil therein falls below a predetermined level.

5. A lubricant apparatus comprising an oil reservoir, an oil box, an oil level controlling member, a ring having a plurality of pockets therein, there being a passage from the oil reservoir through the said oil level controlling member, and there also being a recess in the said oil level controlling member, a shaft upon which the said ring is loosely mounted, a roller on the said shaft, and yielding means extending between the said roller and ring whereby the ring is yieldingly maintained in contact with a surface of the said oil level controlling member in being turned by the said shaft and the oil from the reservoir is permitted to flow successively into the said pockets and ring and from the said pockets to the said oil box when the oil therein falls below a predetermined level.

6. A lubricant apparatus comprising an oil reservoir, an oil box, an oil level controlling member, a ring having a plurality of pockets therein, there being a passage from the oil reservoir through the said oil level controlling member, and there also being a recess in the said oil level controlling member, a shaft upon which the said ring is loosely mounted, a roller on the said shaft, and springs extending between the said roller and the said ring for yieldingly maintaining the said ring in contact with the face of the oil level controlling member in being turned by the said shaft and the oil from the reservoir is permitted to flow successively into the said pockets and ring and from the said pockets to the said oil box when the oil therein falls below a predetermined level.

In testimony that I claim the foregoing as my invention, I have signed my name in presence of two witnesses, this ninth day of August, 1921.

ARTHUR GRÜTZNER.

Witnesses:
 EMIL JACOBY,
 KARL HAENCL.